United States Patent [19]

Clark et al.

[11] Patent Number: 4,546,674

[45] Date of Patent: Oct. 15, 1985

[54] METHOD FOR PROVIDING A TOOL FOR FORMING AN ARTICLE

[76] Inventors: Lonel L. Clark, 3712 Somerset La., Fort Worth, Tex. 76107; Ronald H. Ellefson, 1411 Juanita Dr., Arlington, Tex. 76013

[21] Appl. No.: 476,982

[22] Filed: Mar. 21, 1983

Related U.S. Application Data

[62] Division of Ser. No. 201,292, Oct. 21, 1980, abandoned.

[51] Int. Cl.[4] .................................................. B21K 5/20
[52] U.S. Cl. ................................................... 76/107 R
[58] Field of Search .......................... 76/107 R, 101 R

[56] References Cited

U.S. PATENT DOCUMENTS

| | | | |
|---|---|---|---|
| 3,218,369 | 11/1965 | Hinkley | 524/906 |
| 3,412,062 | 11/1968 | Johnson et al. | 523/440 |
| 3,755,223 | 8/1973 | Engel | 523/440 |
| 3,806,489 | 4/1974 | Rioux et al. | 523/468 |
| 3,843,675 | 10/1974 | Porret et al. | 523/468 |
| 3,974,124 | 8/1976 | Pelham | 524/503 |

FOREIGN PATENT DOCUMENTS 71764  6/1979  Japan ............................... 76/107 R

*Primary Examiner*—Roscoe V. Parker
*Attorney, Agent, or Firm*—Wofford, Fails & Zobal

[57] ABSTRACT

A reinforcing material compound and method for employing same characterized by a resin that will cure in the presence of a hardner to form a solid thermosetting plastic, a filler and thickening agent, carbon fibers, and a hardener; the resin, filler and thickening agent, carbon fibers and hardener being in respective porportions such that a solid, stiff backing results when applied to the back surface of a tool. Also disclosed are specific concentrations of the respective ingredients, as well as two component compound such that the respective components can be maintained separately without effecting curing of the resin until they are admixed; as well as a method of providing a tool by emplacing a tooling surface onto a pattern and reinforcing the backside with the reinforcing material compound before the final article is formed by molding, forming, casting or laminating the article onto the tool with the stiffened backing.

4 Claims, No Drawings

METHOD FOR PROVIDING A TOOL FOR FORMING AN ARTICLE

This is a division of application Ser. No. 201,292, filed 10/27/80 and now abandoned.

FIELD OF THE INVENTION

This invention relates to tool making. More particularly, this invention relates to a method of providing a tool for forming an article by employing a reinforcing material compound on the backside of the tool surface for stiffening and reinforcing the tool. In a particular aspect this invention relates to the reinforcing material compound adapted for backing and stiffening a tool that will be employed to form an article by the conventional methods of molding, forming (thermoforming), casting, or laminating the article onto the tool.

DESCRIPTION OF THE PRIOR ART

A wide variety of approaches have been employed in making tools for casting, molding, or laminating articles even though this art as related to plastic articles is relatively recent. One of the approaches that has enjoyed commerical success is to form a blank, or mold, about a pattern. The pattern is chosen to be like the article that is desired to be formed. For example, the pattern may be in the form of a boat hull, automobile body portion, instrument panel or even small articles such as ash trays and the like. The tool is formed by applying a tooling surface to the pattern. For example, the tooling surface may be formed by a plastic surface but is preferably a harder surface such as a metal surface. The advent of arc and flame spraying of metal has made possible the formation of tooling surfaces that were nearly ideal. Such tooling surfaces were, however, flimsy if they were economical enough to be feasible. Forming substantial thickness metallized tooling surfaces was inordinately expensive. Accordingly, a reinforcing material was employed on the backside of the tooling surface. These reinforcing materials took the form of plastics having adequate resistance to temperature.

The best type of plastices were the thermosetting plastics formed by curing a resin with a catalyst. One of the components that was added to the plastics to give it the desired strength was frequently metallic cutting such as aluminum chips or cuttings. These increased the weight particularly if enough of the metallic constitutent was employed to provide the desired structural strength.

Thus it can be seen that the prior art did not provide a high strength, relatively light weight tool formed by rigid backing of appreciable thickness onto the tooling surface.

SUMMARY OF THE INVENTION

Accordingly, it is an object of this invention to provide both a reinforcing material compound and a method for using the same in forming a rigid tool for forming an article, providing both adequate structural stiffening and strength yet having adequately light weight, thereby alleviating the problems of the prior art.

Specifically, it is an object of this invention to provide a lightweight, high strength backing material for a stiffening tool and the resulting stiffening tool employing the tool that alleviates the difficulties with the prior art.

These and other objects will become apparent from the descriptive matter hereinafter.

In accordance with this invention there is provided a reinforcing material compound adapted for backing and stiffening a tool consisting essentially of a resin that will cure in the presence of a hardener, or catalyst, to form a solid thermosetting plastic; a filler and thickening agent; carbon fibers; and a hardener; the resin, filler and thickening agent, carbon fibers and hardner being in respective porportions such that a solid, stiff backing results when applied to the back surface of a tool.

As will be discussed in more detail hereinafter, the reinforcing material compound may be in the form of two components, respective first and second components having, respectively, the resin in one and the hardener in the other so that the two components can be preserved for indefinite periods of time until they are admixed.

The carbon fibers provide high strength with low weight and are a key element of the reinforcing material compound of this invention.

This invention provides in another aspect, a method of providing a tool for forming an article characterized by a plurality of steps as follows. First, a pattern is chosen. Thereafter, a tooling surface is applied to the pattern; a reinforcing material is applied to the backside of the tooling surface for rigidity and the backside of the reinforcing material is finished, as by forming handles and the like. Thereafter, the finished tool is cured and removed. The reinforcing material may be partially cured before the tool is removed from the pattern and allowed to finish curing after removal. Then the article is formed by applying the material of which the article is to be made to the tool; as by molding, forming, laminating, or casting the article.

DESCRIPTION OF THE PREFERRED EMBODIMENTS

This invention is useful in a wide variety of arts. It is particularly useful where a tool of fairly large extent is to be employed, as for forming boat hulls, automobile body parts and the like. It is, however, useful in stiffening even smaller articles such as ash trays, chairs or other types of furniture and the like. Before considering the method, it is believed helpful to describe the reinforcing material compound and the respective elements thereof.

The reinforcing material compound is a material in the form of a putty or the like. It may be formed of two different components, as will be clearer hereinafter. In any event, the compound can be applied on the backside of a tool surface and allowed to cure, or harden, to form the final rigid tool.

As indicated hereinbefore, the reinforcing material compound includes the resin, filler and thickening agent, carbon fibers, and hardener.

The resin may be any of a plurality of resins that will cure in the presence of a hardener, or catalyst, and/or heat to form a solid thermosetting plastic. Illustrative of these are the epoxy resins, polyester resins, vinyl ester resins, phenolic resins, urea resins, melamine resins, polyurethane resins and polyimide resins. These resins are readily commerically available from a wide variety of chemical manufactures. They are, ordinarily, in the form of liquids. Of these resins, the epoxy resins are particularly preferred because of their high strength and resistance to damage from high temperatures. The viscosities of the epoxy resins may vary from less than 100 centipoises (cp) at 26° C. to as high as several thousand centipoises at 50° C. These are conventional and need not be described in great detail herein, having already been employed in this art.

The filler and thickening agent may take the form of calcium carbonate powder, fuse silica powder or similar type fillers. They may also include the thixotropic inducing agents such as silica gel and the like. The size of the filler will be less than one hundred mesh in size and will be the fine fused silica. For example it may be on the order of one to ten microns in the smallest sizes.

The carbon fibers may comprise the graphite fibers or the pure carbon fibers. Ordinarily, they range in length from ⅛ to two inches although the preferred length is the ½ to one inch. The carbon fibers may have a diameter in the range of 0.0005 inch or smaller to 0.003 inch or larger. A particularly preferred group of carbon fibers are the blown insulation type carbon fibers put out under the generic designation of the pitchblend fibers by Union Carbide. These are available in grades running from VMA to VMD. The particular preferred grade is the VMC grade carbon fibers.

The hardener will be any of the catalysts that are effective for effecting curing of the particular resin. For example, the aromatic amines and poly amines form effective hardeners for a wide variety of the epoxy resins. To illustrate, with epoxy type resins the amines as well as antrydrides can be employed as the hardner. Typical hardners are N,N-dimethyl-p-toluidine; N,N-dimethyl-aniline; triethylenetriamine. Moreover, the hardeners may comprise catalysts such as methyl ethyl ketone peroxide.

The poly vinyl alcohol fibers are those fibers currently being employed to replace asbestos fibers. They are made in Japan from the poly vinyl alcohol compounds. They occur in a wide variety of lengths and sizes, similarly as described with respect to the carbon fibers.

As implied hereinbefore, the reinforcing material compound may be formed in two separate components; a first component including the resin, filler and thickening agent and carbon fibers and the second component including at least the hardener. The second component may also include the filler and thickening agent and the poly vinyl alcohol fibers. In this way, the two components may be maintained separately for indefinite storage period times without the resin thickening, or hardening, intolerably. Thereafter, the respective components can be combined and then formed onto the back of the tooling surface as will be described in more detail hereinafter. The two components may be employed in any operative proportion. It has been found that ratios of first to second component within the range of 13:1 to 1:2 can be employed.

In the two component system, the first component includes about 40–75% by weight of the resin. A preferred concentration is formed when the first component includes about 57% by weight of the resin.

The first component includes about 20–40% by weight of the filler and thickening agent. A preferred concentration is formed when the first component includes about 33% by weight of the filler where the filler is a mixture of the fused silica and silica gel in respective porportions in the range of about 20:1 to about 1:1.

The first component includes from about 5 to 20% by weight of the carbon fibers, regardless of whether the graphite fibers or the pure carbon fibers are employed.

A preferred concentration is about 10% by weight of carbon fibers.

While the second component may comprise the hardener alone, ordinarily, its viscosity is not great enough and preferably the second component includes about 30–50% by weight of hardener; with a particular preferred concentration being about 41% by weight of hardener.

The second component preferably includes 40–70% by weight of the filler and thickening agent. The particularly preferred concentration is about 51% by weight of the filler and thickening agent where the filler comprises fused silica and silica gel in proportions in the range 20:1 to about 1:1.

The second component includes about 1–10% by weight of poly vinyl alcohol fibers. A preferred concentration is about 7.5% by weight of poly vinyl alcohol fibers.

Where it is desired to determine when substantially uniform mixing has taken place, a coloring agent such a titanum dioxide in a concentration of about 1–10% by weight of one of the components is included in one of the components. For example, about 7% by weight of the coloring agent may be included in the second component such that when it is admixed with the first component, a uniform color intermediate the two colors of the respective two components can be used to detect when uniform admixing has taken place. The coloring agent is in the form of small, fine particles such as the titanum dioxide powder. Of course, other coloring agents can be employed as desired to effect the desired coloration.

In the method aspect of this invention, there is provided a tool for forming an article by the following plurality of steps. (1) A pattern is chosen. This may be simply choosing an article like the one that is to be formed. On the other hand, it may necessitate the making of a mold. (2) A tooling surface is a applied to the pattern. The tooling surface may be formed by flowing onto the surface of the pattern, a plastic and allowing it to cure. On the other hand, more durable surfaces are formed by employing harder tooling surfaces. One of the excellent ways that has been developed in recent times has been the use of spraying of metal forming surfaces. This is done by spraying through an arc or a flame, particles of metal to form a tooling surface onto the surface of the pattern. Any other of the conventional methods may be employed. (3) There is applied to the backside of the tooling surface a reinforcing material that includes the reinforcing material compound delineated hereinbefore. A particularly preferred method is formed when a two component system is employed and the second component containing the hardener, filler and thickening agent and poly vinyl alcohol fibers are first brushed onto the tooling surface in a thin layer; and, thereafter, a thick layer of the reinforcing material is formed by combining the first and second components and spading, or spraying, a thick layer of the reinforcing material compound onto the back of the tooling surface and the first layer, if employed, of the second component. (4) The backside of the finishing tool is finished by forming the handles or the like of the reinforcing material. (5) The finished tool is allowed to partially cure, is then removed from the pattern and is then allowed to cure into final form. This may take from a few minutes to as much as several hours for the curing to take place. It can be expedited by use of somewhat elevated temperatures. (6) The article is then formed by molding, forming, casting, or laminating the surface of the article onto the tooling surface. Thereafter, the article is allowed to cure if curing time is required and then is removed from the tooling surface that has been adequately reinforced by the reinforcing material compound. Another article is formed by repeating as many times as is necessary in the production operation.

The following examples are included to illustrate operative reinforcing material compounds of this invention.

EXAMPLE I

In this example, there was a two component mixture that was employed in a proportion of mixing two parts by weight of the first component to one part by weight of the second component or in equal volumes. This formed a very good mixture and had excellent properties. The Table I below gives the respective compositions in weight percent (wt. %).

TABLE I

| Component I | |
|---|---|
| Material | Concentration (wt. %) |
| Resin - Epon 828 (epoxy) | 74.1% |
| Filler - Calcium Carbonate | 18.5% |
| Silica Gel | 1.4% |
| Carbon Fibers - Graphite Fibers | 6.0% |

Table II shows the composition of the second component.

TABLE II

| Component II | |
|---|---|
| Material | Concentration (wt. %) |
| Hardener - Versamide 140 | 70.3% |
| TETA - Triethylenetriamine | 10.1% |
| Filler - Calcium Carbonate | 8.3% |
| Carbon Fibers - Graphite Fibers | 8.2% |
| Poly Vinyl Alcohol Fibers | 3.1% |

EXAMPLE II

The following example provided a high temperature super quick tool. Table III shows the composition of the first component.

TABLE III

| Material | Concentration (wt. %) |
|---|---|
| Resin (70% Epon 828 and 30% Calcium Carbonate) | 60.3% |
| Filler - Silica | 25.6% |
| Cabosil - Silica Gel | 1.2% |
| Graphite Fibers | 10.3% |
| Poly Vinyl Alcohol Fibers | 2.6% |

To this was added 7.3% of the total weight of hardener 9231. This gave very good structural results having a flexural of 18,000 pounds per square inch (psi) at room temperature and 12,000 psi at 300° F.; a compression strength of 22,000 psi at room temperature and 17,000 psi at 300° F.; and a tensile strength of 9,000 psi at room temperature.

EXAMPLE III

The following example was deemed to be the best performing compound. Table IV gives the composition of the first component.

TABLE IV

| Material | Amount |
|---|---|
| Resin - Epon 828 | 23 pounds |
| Filler - 810 Silica | 13 pounds |
| Carbon Fibers | 4 pounds |

Table 5 gives the formulation of the second component.

TABLE V

| Material | Concentration |
|---|---|
| Hardener | 40% by weight |
| Filler - 810 Silica | 46% by weight |
| Poly Vinyl Alcohol Fibers | 7% by weight |
| Titanum Dioxide Coloring | 7% by weight |

The components could be mixed in porportion of 5:1 to 1:2 to obtain a satisfactory stiffening on the back of the tool. Preferably, the second component was formed into a layer on the back of the tooling surface before the total compound was emplaced. This was employed in the method described hereinbefore and gave excellent results.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter purpose being had to the appended claims.

We claim:
1. A method of providing a tool for forming an article comprising the steps of:
   a. choosing a pattern of said article;
   b. applying to said pattern a tooling surface;
   c. applying to the back side of said tooling surface a reinforcing material consisting essentially of two components, the first component including:
      i. a resin that will cure in the presence of a hardner to form a solid thermosetting plastic;
      ii. a filler and thickening agent, and
      iii. carbon fibers, and a second component including:
      i. a hardener,
      ii. said filler and thickening agent,
      iii. poly vinyl alcohol fibers; and
   d. applying to said tooling surface a primer coat of said second component and, thereafter,
   e. applying a seal coat of said first component such that said resin, filler and thickening agent, carbon fibers and hardener are in respective proportion such that a solid, stiff backing results when applied to the back surface of the tooling surface;
   f. finishing the tool by finishing said back side reinforcing material, including putting handles and the like thereon;
   g. removing the finished tools; and
   h. curing the finished tool for forming the article.
2. The method of claim 1 wherein said seal coat includes said second component admixed with said first component and the porportion of said first component to said second component is in the range of 13:1 to 1:2.
3. The method of claim 2 wherein said first component includes 40–75% by weight of said resin, 20–40% by weight of said filler and thickening agent, and 5–20% of said carbon fibers; and said second component in- cludes 30-70% by weight of said hardner, 40-60% by weight of said filler and thickening agent, and 1-10% by weight of said poly vinyl alcohol fibers.

4. The method of claim 3 wherein 1-10% by weight of coloring agent is including in one of said components to give it a color different from said other such that the uniform color is achieved when there is substantially uniform mixing of the two components.

* * * * *